United States Patent [19]

Fronk

[11] Patent Number: 4,502,440

[45] Date of Patent: Mar. 5, 1985

[54] FUEL INJECTOR GOVERNOR

[75] Inventor: Matthew H. Fronk, Rochester, N.Y.

[73] Assignee: General Motors Corporation, Detroit, Mich.

[21] Appl. No.: 605,067

[22] Filed: Apr. 30, 1984

[51] Int. Cl.³ ............................................. F02D 31/00
[52] U.S. Cl. .................................... 123/367; 123/373; 123/358
[58] Field of Search ............... 123/367, 358, 372, 373, 123/374, 365, 366, 368–371

[56] References Cited

U.S. PATENT DOCUMENTS

| | | | |
|---|---|---|---|
| 3,871,344 | 3/1975 | Pigeroulet et al. ................ | 123/358 |
| 4,223,654 | 9/1980 | Wessel et al. ...................... | 123/358 |
| 4,243,004 | 1/1981 | Ritter et al. ....................... | 123/358 |
| 4,357,920 | 11/1982 | Stumpp et al. .................... | 123/358 |
| 4,454,783 | 6/1984 | Sierk et al. ........................ | 123/372 |

FOREIGN PATENT DOCUMENTS 163534  6/1955  Australia ............................ 123/373

Primary Examiner—Magdalen Y. C. Moy
Attorney, Agent, or Firm—Howard N. Conkey

[57] ABSTRACT

Minimum and maximum fuel delivery of a mechanical diesel engine fuel injector is limited by the use of a single actuator which provides for a minimum fuel limit or maximum fuel limit in accord with a predetermined schedule. A failsafe mode of operation of the engine is provided in the event of a failure of the actuator.

2 Claims, 1 Drawing Figure

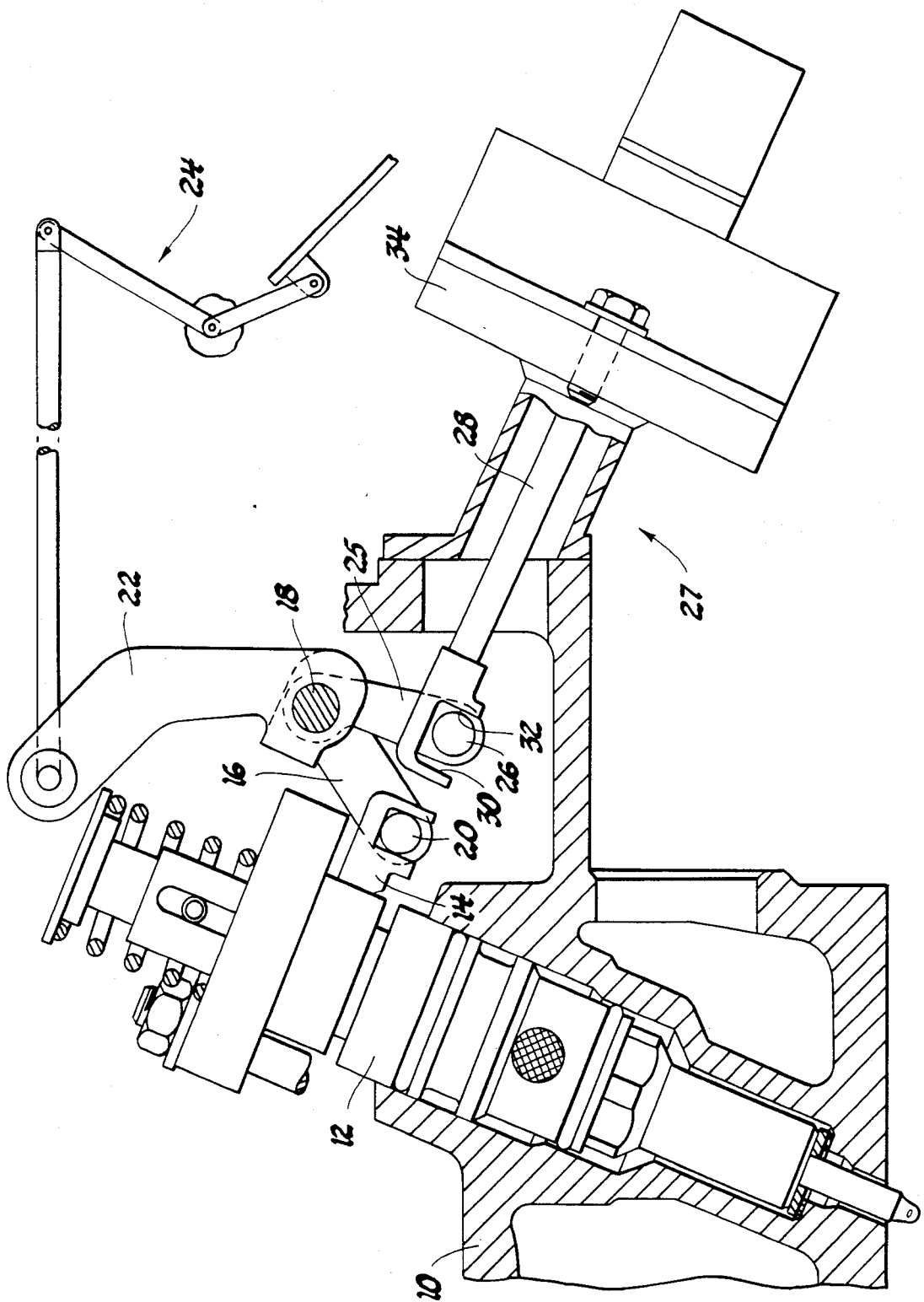

FUEL INJECTOR GOVERNOR

This invention relates to a governor for a mechanical fuel injector and more specifically to a governor for controlling the maximum and minimum fuel injection quantities provided by a diesel engine fuel injector having a fuel rack positioned to adjust the injection quantity.

Typical direct injection diesel engines employing mechanical unit fuel injectors utilize mechanical means to establish idle speed and top speed with no provision to limit or control injected fuel intermediate the two extreme points. Other systems have employed a mechanical stop whose position is adjusted to limit the maximum fuel injected by a fuel injector in order to inhibit excessively rich air-fuel mixtures and the resulting smoke emissions. Other forms of governing are also known, but are generally complex and costly.

The subject invention provides for a controller that selectively controls both the maximum and minimum fuel quantities injected into a diesel engine by a mechanical fuel injector. One feature of this controller is that it employs a single actuator for controlling both the maximum and minimum fuel quantities. This results in a controller that is more sophisticated in it's control but mechanically less complex and more economical. Another feature of this invention is the provision for failsafe operation of the diesel engine over substantially its full operating range in the event of a failure of the fuel limit controller.

The invention may be best understood by reference to the single figured drawing which illustrates a controller for limiting the minimum and maximum fuel quantities injected by a diesel engine unit injector in accord with the principles of this invention.

Referring to the FIGURE, a multi-cylinder diesel engine 10 includes a number of mechanical unit injectors such as the injector 12, each injector injecting a metered quantity of fuel into a respective cylinder of the engine in timed relation to the engine operation. This form of unit injector is well known and in general includes a fuel rack 14 which is movable to control the quantity of fuel injected into the diesel engine 10 with each injection stroke. When the fuel rack 14 is moved toward the injector 12 as viewed in the FIGURE, the injected fuel quantity is increased. Conversely, when the fuel rack 14 is moved to the right, the injected fuel quantity is decreased. The fuel rack 14 is positioned by a rack control lever 16 to control the quantity of fuel injected. The rack control lever 16 is secured to a control shaft 18 for rotation therewith. The fuel rack 14 terminates in a forked portion that captures a pin 20 projecting from the rack control lever 16 so that the fuel rack 14 is moved right or left by rotation of the control shaft 18. A control arm 22 is secured to the control shaft 18 such as by a torsion spring (not shown) and rotates the control shaft 18 in response to an engine operator input via a conventional accelerator pedal and linkage 24.

When the control shaft 18 is rotated clockwise via the accelerator and linkage 24 and the control arm 22, the fuel rack 14 is moved to the left to increase the injected fuel quantity. Conversely, when the control shaft is rotated counterclockwise when the accelerator pedal and linkage 24 is returned toward an idle position, the fuel rack 14 is moved toward the right to decrease the injected fuel quantity. For each additional unit injector in the diesel engine 10, a rack control lever identical to the rack control lever 16 is provided mounted to the control shaft 18 so as to control the quantity of fuel injected into the respective cylinder.

The minimum and maximum fuel quantities to be injected into each cylinder of the diesel engine 10 is established by limiting the movement of the fuel rack 14. This is accomplished in accord with this invention by means of a governor lever 25 secured to the control shaft 18 and which includes a finger 26 protruding therefrom. A fuel limiter generally designated 27 includes a shaft 28 that terminates in a pair of opposed surfaces including a maximum fuel limit surface 30 and a minimum fuel limit surface 32. The maximum fuel limit surface 30 is contacted by the finger 26 of the governor lever 25 when the control shaft 18 is moved in a clockwise direction to increase the fuel quantity injected by the unit injector 12 as the fuel rack 14 is moved to the left. The minimum fuel limit surface 32 is contacted by the finger 26 when the control shaft 18 is moved in a counterclockwise direction decreasing the fuel injected by the unit injector 12 as the fuel rack 14 is moved to the right. The shaft 28 is moved to position the opposed surfaces 30 and 32 along the path of travel of the finger 26 by means of an actuator 34 which may take the form of a stepper motor. Operation of the actuator 34 is effective to linearly move the shaft 28. Rotation of the actuator 34 in one direction causes the shaft 28 and the two fuel limit surfaces 30 and 32 to move linearly to the right. Conversely, rotation of the actuator 34 in the opposite direction causes the shaft 28 and the two fuel limit surfaces 30 and 32 to move linearly to the left.

In operation of the governor, when the accelerator pedal is released and returned to the idle position such as by a return spring (not illustrated), the actuator 34 is operated to position the minimum fuel limit surface 32 to control, for example, the idle speed of the diesel engine 10. By positioning the surface 32 to limit the counterclockwise rotation of the governor lever 25 and accordingly the rightward movement of the fuel control rack 14, the minimum fuel may be continuously controlled for idle speed control. Conversely, when the accelerator pedal is depressed to rotate the control shaft 18 in a clockwise direction to move the fuel rack 14 to the left to increase the fuel injection quantity, the actuator 34 is controlled to position the maximum fuel control surface 30 at a position representing the maximum allowable fuel injection amount. As the control shaft 18 is rotated clockwise to increase the fuel delivery, leftward movement of the fuel rack is limited at the point where the finger 26 engages the maximum fuel limit surface 30.

In summary, by controlling the position of the maximum fuel limit surface 30 during off idle operating conditions of the engine 10, the maximum fuel quantity injected by the unit injector 12 may be limited to any desired value. By controlling the position of the minimum fuel limit surface 32 during idle operating conditions of the engine 10, the minimum fuel quantity injected by the unit injector 12 may be limited to any desired value. As can be seen, the minimum and maximum fuel limit values are established by a single actuator 34.

In an additional feature of this invention, the spacing between the control surfaces 30 and 32 is such that for a constant position of the shaft 28, the control shaft 18 may be rotated through an angle that provides substantially a full range of operation of the diesel engine 10 between idle and full load. Therefore, in the event of a failure in the actuator 34 so that the surfaces 30 and 32 cannot be positioned, the control shaft 18 may still be rotated by operation of the accelerator pedal and linkage 24 to provide substantially a full range of operating conditions of the diesel engine 10.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A controller for an internal combustion engine fuel injector having a fuel rack moveable in fuel increasing and decreasing directions for controlling the quantity of fuel injected into the engine by the fuel injector, the controller comprising:
    a governor element secured for movement with the fuel rack in the fuel increasing and decreasing directions;
    a fuel limiter element having a first fuel limit surface engaged by the governor element when moved in the fuel increasing direction and a second fuel limit surface engaged by the governor element when moved in the fuel decreasing direction, the movement of the fuel rack being restricted to the movement of the governor element between the first and second fuel limit surfaces; and
    an actuator responsive (A) to minimum fuel limit commands to move the fuel limiter element to position the second fuel limit surface to limit the movement of the governor element in the fuel decreasing direction at a position corresponding to a desired minimum fuel position of the fuel rack and (B) to maximum fuel limit commands to move the fuel limiter element to position the first fuel limit surface to limit the movement of the governor element in the fuel increasing direction at a position corresponding to a desired maximum fuel position of the fuel rack, whereby the limit of both minimum and maximum quantities of the fuel injected into the internal combustion engine are established by a single fuel limiter element and actuator.

2. The controller of claim 1 wherein the first and second fuel limit surfaces are spaced to allow a predetermined range of movement of the governor element and the fuel rack that corresponds to a predetermined range of engine operation, whereby the allowed range of movement of the governor element and fuel rack provides a failsafe operating range of the engine without fuel limit control in the event of a failure of the actuator.

* * * * *